Feb. 21, 1950            H. ROGER            2,498,580
OPTICAL DEVICE FOR CINEMATOGRAPHIC PROJECTION APPARATUS
WITH CONTINUOUS UNROLLING OF THE FILM
Filed July 7, 1947            5 Sheets-Sheet 3

Inventor
Henri Roger

Patented Feb. 21, 1950

2,498,580

UNITED STATES PATENT OFFICE 2,498,580

OPTICAL DEVICE FOR CINEMATOGRAPHIC PROJECTION APPARATUS WITH CONTINUOUS UNROLLING OF THE FILM

Henri Roger, Sezanne, France

Application July 7, 1947, Serial No. 759,436
In France July 17, 1946

8 Claims. (Cl. 88—16.8)

It has already been proposed, in order to permit the continuous feeding of the film in cinematographic projectors, to interpose between the film and the objective optical devices designed to ensure, notwithstanding the continuity of the movement of the film, the successive projection of the images on the screen, without interference and in correct superposition.

All these devices, which make use of rotating or oscillating, simple or prismatic mirrors, necessitate the use of delicate mechanisms which have made it impossible to use them successfully on an industrial scale, and many among them did not dispense with the shutter and therefore were always subject to the loss of light caused by the latter.

With the same object in view, there has also been proposed a device based on the rocking of a simple or multiple blade having parallel faces (a prism with an even number of faces) introduced between the film and the objective in such a manner that, at any moment, the deviation of the beam of light produced by the blade with parallel faces is equal with, and opposite in direction to the displacement of the film.

The result of this arrangement is that the fictitious image which is seen through the blade seems to be motionless and is received by the objective as if it were a fixed image, so as to be transmitted onto the screen.

Unfortunately, this optical device, which seemed at first to be very advantageous, has not given either interesting practical results, for it is fundamentally vitiated by the systematic and unavoidable introduction of an astigmatism of the beam of light, when the blade with parallel faces takes an inclined position. This astigmatism causes an inacceptable lack of clearness on the projecting screen.

It has been attempted to remedy this drawback by closing the shutter during the length of time in which the blades with parallel faces have a too accentuated inclination, but this leads to a very important loss of light, without gaining sufficiently in clearness of the image on the screen.

The present invention has for its object a cinematographic projection apparatus with continuous unrolling of the film, the optical device of which comprises the use of a rotating prism the faces of which are parallel by pairs, but in which the said device has been improved so that the astigmatism is corrected, while any closing of the objective is dispensed with.

Before disclosing the characteristic features of the invention, it will be necessary to remind of the part played in the projection by the prism having pairs of parallel faces, supposing that the optical device is limited to the use of this prism.

Figure 1:
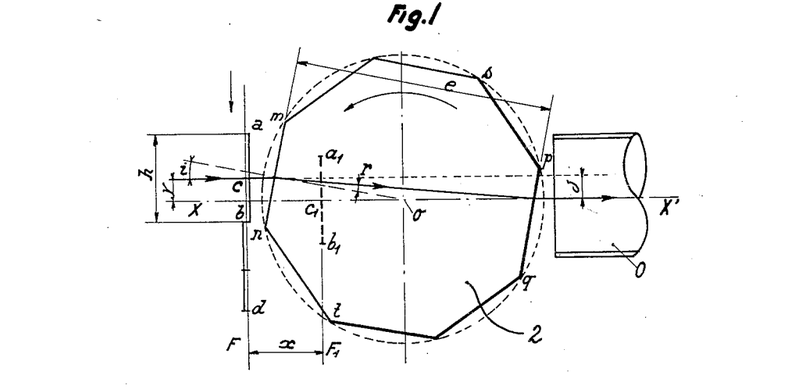
Fig. 1 of the accompanying drawings shows schematically the deviation of the beam of light by the prism with parallel faces.

On Fig. 1, the reference 2 indicates the prism having an even number of faces and rotating about its axis, which intersects the optical axis of the objective O in a fixed point o, in such a manner that, each time the center of an image is placed on the axis of the objective, the corresponding face of the prism is simultaneously in a position perpendicular to said axis and with its center on said axis, and that at any moment the vertical displacement of a point of the image, measured from its passage on said axis, is equal to the deviation produced by the blade constituted by the two parallel faces of the prism which are effective at the considered moment.

The blade with parallel faces $m$—$n$—$p$—$q$, the thickness of which is $e$ and which is interposed between the film F and the objective O, has the effect of producing, of an image on the film F, an image situated in the plane $F_1$, that is to say displaced towards the objective by a distance $$x = e \frac{n-1}{n}$$

$n$ being the index of refraction.

When the blade takes an inclined position (Fig. 1), the position of the plane $F_1$ remains unchanged, but the image is displaced in this plane by a distance $\delta$ such that:

$$\delta = e \frac{\sin(i-r)}{\cos r}$$

$i$ and $r$ being respectively the angle of incidence of the light beam and the angle of refraction.

Under these conditions, it is easily understood that, if the rotary movement of the blade about its center $o$ is such that at each moment the ordinate $y$, for example, of the center $o$ of an image on the film is equal to the deviation produced by the blade, the fictitious image of said center on the plane $F_1$ will remain stationary, as well as its real image on the projecting screen.

Each time the image of the film has been displaced by its pitch $h$, the following image of the film is received by the following blade with parallel faces of the prism, and so forth. As may be seen in Fig. 1, the blade $n$—$t$—$p$—$s$ accompanies the image $b$—$d$, whereafter the blade $m$—$n$—$p$—$q$ accompanies the image $a$—$b$, etc.

It will be understood that, under the above indicated conditions, the edges $m$ and $q$, or $n$ and $p$, of the prism will pass through the optical axis X—X' simultaneously with the edges $a$ and $b$ constituting the separating lines between the consecutive images.

It is necessary to obtain at any moment: $y = \delta$.

The calculation shows that in order to fulfil this condition, it is necessary to have, whichever be the value of the angle $i$:

$$\frac{Nhi}{\pi} = 2R \cos \frac{\pi}{2N} \sin i \left[1 - \sqrt{\frac{1-\sin^2 i}{n^2-\sin^2 i}}\right]$$

wherein $2R$ is the diameter of the circle circumscribed to the polygonal section of the prism, $2N$ is the number of faces of the prism, and $n$ the index of refraction of the glass constituting the prism.

This equation, in which the angle $i$ appears simultaneously in radiants, in sine and under the radical-sign, is irrational and cannot be resolved.

It appears besides a priori that the equality of $y$ and $\delta$ cannot be obtained for any value of $i$; but the angle $i$ is used only between very small limits, since as soon as an image has passed in front of the opening of the window, the following image is taken over by another blade with parallel faces, so that it is more practical, while making methodical tests with various values of $2N$, $2R$ and $n$, to calculate, for the values of $i$ comprised within the limits of utilization, the difference $D = y - \delta$, and to examine this difference comparatively with the separating power of the objective. The results of the calculations, which are made by degrees by varying N, $n$ and R, can be represented graphically by curve $a$ of D in function of $i$. By taking as abscisses the angles $i$ in degrees and as ordinates the values of D in hundredths of a millimeter, one obtains curves as shown on Fig. 2.

Figures 2, 3, 4, 5:
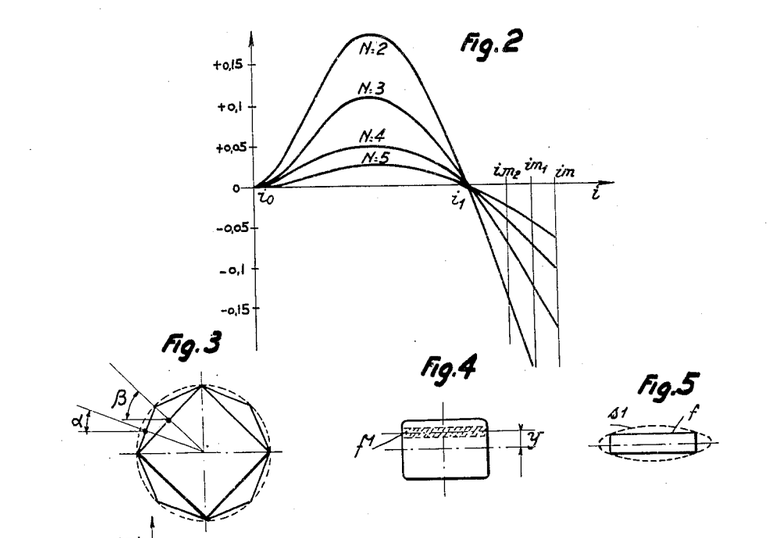
Fig. 2 is a diagram showing the variations, according to the number of faces of the prism, of the difference between the ordinate of a point of the image with respect to the optical axis, and the deviation produced by a blade with parallel faces placed obliquely with respect to said axis.
Fig. 3 shows the variations of the angle of maximum incidence of the beam of light on the blade with parallel faces, according to the number of faces of the prism.
Figures 4 and 5 are explanatory views showing the part played by the window of reduced height and the astigmatic condenser.

The examination of these curves teaches the following:

1. Each curve intersects the axis of the abscisses for $i = i_0 = 0$, and for $i = i_1$.
2. By leaving N and $n$ constant, while increasing R, $i_1$ approaches the point of origin and the values of D are improved in the interval between $i_0$ and $i_1$, but increase beyond $i_1$, that is to say between $i_1$ and $i_m$ (the latter being the greatest angle under which the blade with parallel faces is used).
3. By reducing R, the inverse phenomenon happens.
4. Between $i_0$ and $i_1$, the values of D are positive; between $i_1$ and $i_m$, the values of D are negative, but in this interval they vary much more quickly than in the interval between $i_0$ and $i_1$.
5. When N increases, the values of D are improved quickly over the entire useful zone of $i$, but unfortunately $2R$ must increase at the same time, and the prism reaches measurements which are incompatible with the frontal of current objectives.

For example, if the system is to be applied to current professional projecting apparatus, using objectives having from 90 to 140 mm. of focal length and normal film of 35 mm., it is necessary to be able to use the rotating prism with frontals of about 55 to 60 mm.

The calculation shows that it is under these conditions impossible to reduce the maximum D of the curve of Fig. 2 to less than one-tenth of a mm. which would be inacceptable.

A similar statement can be made for current narrow films (16 or 9 mm.), all proportions being maintained.

It results therefrom, as already stated above, that by using a rotating prism with parallel faces and a continuously unrolled film illuminated in the usual manner through a window having the size of the image, it is impossible to obtain a sufficient immobility of the fictitious image $F_1$ and, consequently, of the image projected on the screen.

On the other hand, the introduction of a blade with parallel faces inclined with respect to the path of the light beam produced an astigmatism of this beam. This astigmatism increases with:

1. The angle of incidence of the beam upon the blade with parallel faces, and
2. The opening of the incident beam.

Fig. 3 shows clearly that with a square prism (N=2) the maximum angle of incidence is $\beta = 45°$, while with a prism having eight faces (N=4) the maximum angle of incidence $\alpha = 22° 30'$ is only half as great, and so forth, when the number N is further increased.

Calculation and practice have shown that with N=2 and N=3 the astigmatism in the upper and lower parts of the projected image is inacceptable. With a prism having 8 faces (N=4) the projected image is satisfactory.

It would therefore be of interest, in order to obtain a maximum correction of the astigmatism (as for the correction of $D = y - \delta$ discussed above) to increase the number of faces $2N$ of the prism; but it has been shown that this increase is limited by the necessity of locating the prism in the limited space comprised between the film and the objective.

In practice, the calculation shows that one can not go beyond $N=4$ or $N=5$ in a standard apparatus capable of using objectives with all current focal lengths.

This does not mean that it is impossible to use prisms with $N=6$ or $7$, etc. These give on the contrary a more perfect correction, but they make it impossible to use in the apparatus objectives with focal lengths from 90 to 110 mm., which is however not of great importance for certain large theaters.

According to the present invention, instead of illuminating the film as in the usual projection, the height of the projecting window is reduced so as to illuminate only a narrow band of the film.

The height of this window is preferably reduced so as to give it the shape of a slot extending transversally to the direction of advance of the film and having about one fourth of the height of the image. It is to be understood that on the film used in the projection apparatus according to the invention the height of each image (i. e. the dimension of each image in the longitudinal direction of the film) is normal, that is to say, such that each image could, if desired, be taken or projected as a whole by the objective O. On the other hand, means such as an astigmatic condenser with horizontal axis, constituted by a system of lenses having cylindrical surfaces, are provided in order to transform the conical converging beam of the illuminating lantern into a flat beam of elliptical section framing said slot.

The loss of light which would otherwise result of the reduction of height of the projecting window is thus reduced to a minimum.

When the illumination is effected by a lamp having a short rectilinear filament, the astigmatic condenser is dispensed with, and a mirror is placed so as to bring the image of the linear source of light to a position slightly in front of the window of reduced height.

On the other hand, behind the projecting window, slightly behind the point of convergence of the anamorphosed beam of light, is placed a divergent cylindrical collecting lens the generating-lines of which are parallel to the window, so as to make the beam of light traversing the prism converge in the nodal point of the objective.

By these means is obtained a considerable correction of the astigmatism produced by the blade with parallel faces, and the loss of a large part of the light by diffusion through the faces of the prism which are not used at a considered moment is avoided.

Advantageously, in order to correct on the other hand the spherical aberration produced by the blade with parallel faces, use may be made of an objective calculated so as to leave a residue of spherical aberration which is equal with, and contrary in direction to the spherical aberration produced by said blade.

Finally, in order to correct the residue of astigmatism, a bi-cylindrical lens with parallel and horizontal axes, introducing a compensating astigmatism, is placed between the prism and the objective.

In order to avoid the "jumping" of the image, particularly when an objective of small frontal length is used, the invention comprises further the replacement of the continuous uniform rotation of the prism by a continuous ondulated rotation.

In an embodiment, the shaft of the prism carries a disk formed with slots the number of which is equal to the number of faces of the prism, and driven by a second disk carrying on its periphery a determined number of balls adapted to engage successively the successive slots of the first mentioned disk.

The characteristic features of the optical device combined with a projecting apparatus with continuous unrolling of the film according to this invention will now be described more in detail, with reference to Figs. 4 to 15 of the accompanying drawings.

Referring now to Fig. 4, it will be seen that, due to the reduction of height of the window, the fictitious image in the plane $F_1$ of Fig. 1 will be obtained by the passage of a narrow beam $f^1$ which will transmit instantaneously only a fraction of the image, instead of the whole image. But each transmitted band having the ordinate $y$ will always be transmitted with the same value of $i$, that is to say with the same inclination of the blade with parallel faces; as a consequence, there will occur no hopping of the image to one and the other side of its theoretic position, since for each value of $i$ a single band of the image will be determined, with a fixed value of $y-\delta=D$.

On the contrary, there will be a deformation of the image in the direction of its height and variable with the value of $i$. This deformation parallel to the longer side of the image has somehow the character of a distortion, but with the difference that the distortion produced in a centered system is concentrical with the axis thereof and consequently deforms the horizontal and vertical lines so as to give them a curved shape resembling to a crescent or to a barrel. On the contrary, in the present case, the vertical and horizontal straight lines remain straight. This "neo-distortion" is besides very small. The maximum acceptable value of D may be indicated as being one tenth of a mm.

Compared with the height of the image, this represents an anamorphosis of $0.1/16 = 1/160$, which is negligible and absolutely invisible at the projection.

The illumination along a narrow band will furthermore cause a considerable reduction of the maximum angle of use $im$ of the blade with parallel faces; this angle passes from $im$ to $im_1$ (Fig. 2), so that D is further improved in the upper and lower parts of the image.

This improvement is still more appreciable because the height of the images is inferior to the pitch $h$ of the film, due to the presence of an interval of 3 mm. produced between the images by the frame (American sound size), which reduces the maximum angle to $im_2$.

The above reasoning has been made for extreme conditions, that is to say the band of illumination has been supposed to be infinitely narrow. In practice, this would be impossible without an enormous loss of light.

In order to avoid this, and as already stated, the height of the projecting window will be reduced to about one fourth of the height of the image, and on the conical converging beam of the lantern will be interposed an astigmatic condenser 3 (Fig. 6) with horizontal axis, constituted by a system of lenses having cylindrical surfaces.

By this condenser, the conical beam having a circular cross section is transformed into a conoid beam having an elliptical cross section $s^1$ (Fig. 5) which makes it possible to cover the rectangular window $f$ under the best conditions, with a minimum loss of light.

Although the fact of illuminating the film through a narrow window avoids the jumping of the image and ensures, as explained above, the immobility of the image on the screen, it does not correct the whole of the astigmatism introduced by the blades with parallel faces, even when N is given a high value, which is the best for reducing the angle of maximum incidence $i_m$ as much as possible.

The cone of light rays PKW passing through the prism 2 (Fig. 6) is very wide open and diverging, while in order to reduce as much as possible this residual astigmatism, the beam passing through the prism should rather be converging.

A further consequence is that a great part of the light is lost, since it is not received by the objective and is diffused by the other faces of the prism, which are not used at the considered moment.

According to the invention, this double drawback is remedied by the addition of a diverging cylindrical collecting lens the generating-lines of which are parallel to the window, immediately behind the latter and slightly behind the point of convergence of the anamorphosed beam of light.

This lens 4 (Fig. 6) is specially calculated so as to transport the point of convergence K to K1, which is the nodal point of the objective.

Figure 6:
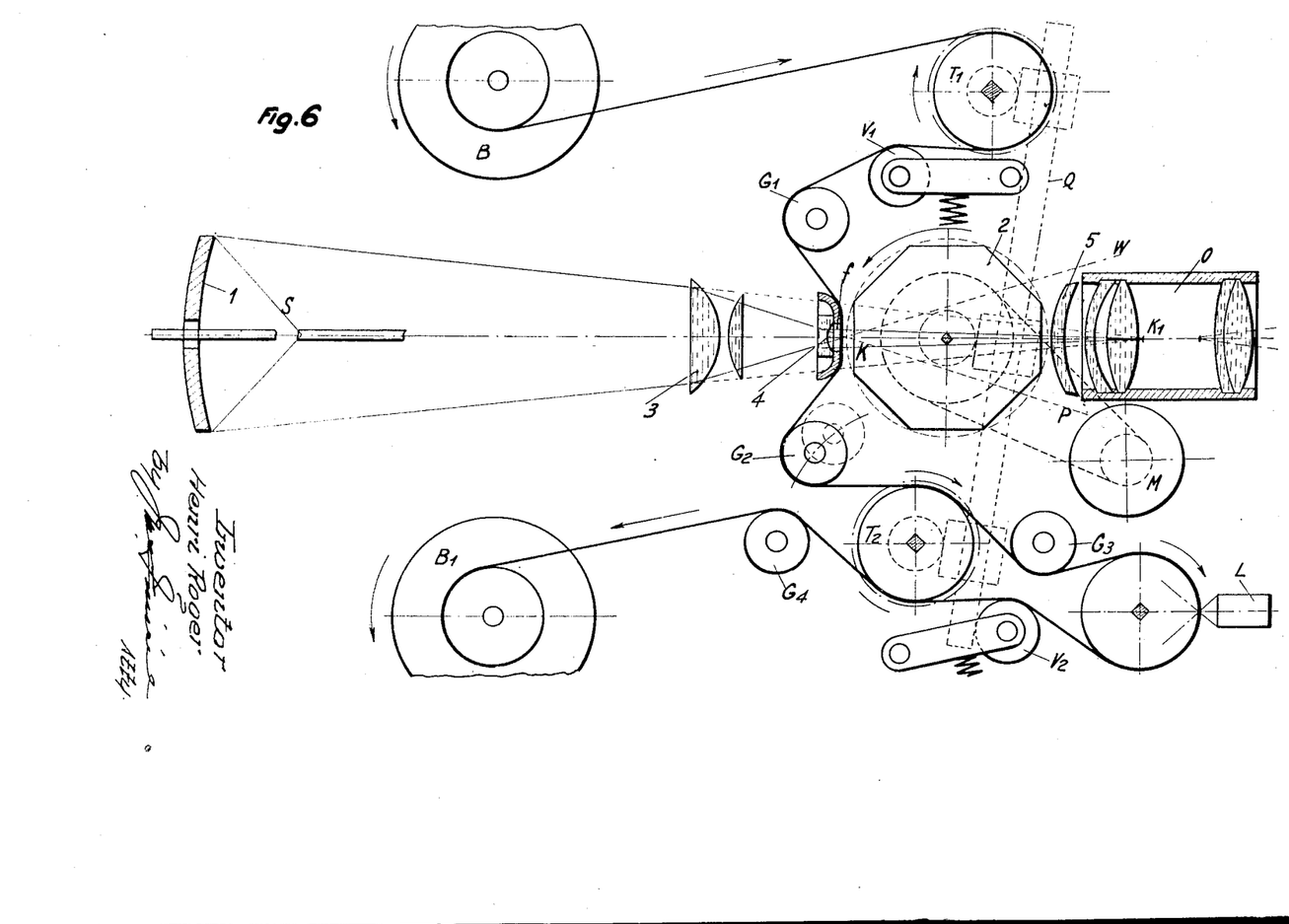
Figures 6 is a schematical view of the whole of the optical device mounted in the projecting apparatus.

A simple examination of Fig. 6 shows that all the light passing through the window $f$ passes also into the objective, and that the prism 2 is traversed by a beam which converges at K1.

The astigmatism is thereby reduced to its minimum minimorum, which is acceptable, as shown by calculation and practice.

However, besides this astigmatism, the thick blade with parallel faces introduces also a spherical aberration which reduces the sharpness of the projection.

The sharpness of the projection may be further improved by using an objective having special characteristics, calculated in order to compensate, on the one hand, this spherical aberration and, on the other hand, the residue of astigmatism.

1. *Correction of the spherical aberration.*—The problem is very simple; it will be sufficient, in the calculation of the objective, to leave a residue of spherical aberration equal with and opposed to the spherical aberration introduced by the blade with parallel faces.

2. *Correction of the residue of astigmatism* (see Fig. 7).—It has been explained that the rotating prism with parallel faces, combined with the illumination through a narrow slot, results in the formation of a fixed fictitious image A1B1C1 swept by a narrow flat beam falling upon the objective, which projects this fictitious image A1B1C1 upon the screen.

Figure 7:
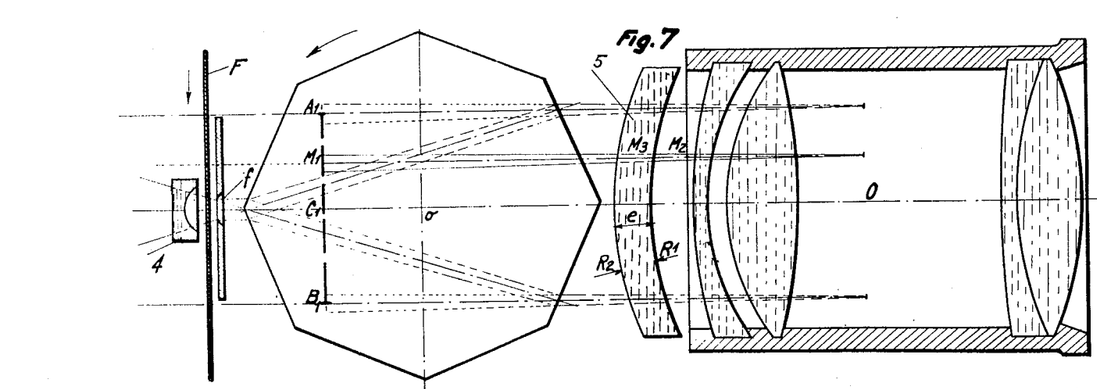
Figure 7 is an explanatory schematical view showing the part played by the lens for correcting the residue of astigmatism, placed between the prism and the objective.

It may be seen on Fig. 7 that any point M1 of the fictitious image is projected upon the screen by the flat beam the axis of which is M1M2 and which passes always through the same region M2 of the objective.

In order to correct the residual astigmatism, it is therefore sufficient to interpose between the prism and the objective a lens 5 which is such that the astigmatism at M1 of the fictitious image A1B1 be corrected at any moment by the compensating astigmatism of the lens 5 at M3.

This lens is evidently a bicylindrical lens with parallel and horizontal axes. In the calculation of this lens, the variables are: R1, R2, $n$ and $e$, in order to ensure this compensation of astigmatism, from the center C1 to the edges A1 and B1 of the fictitious image A1B1.

Figure 9:
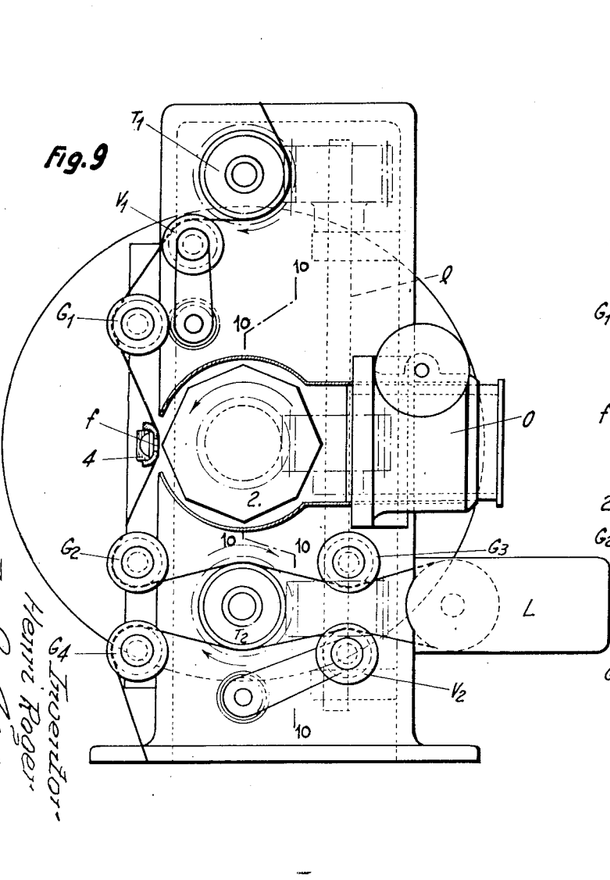
Figure 9 is a side elevation of the apparatus, the film guide being shown in section.
Figure 10:
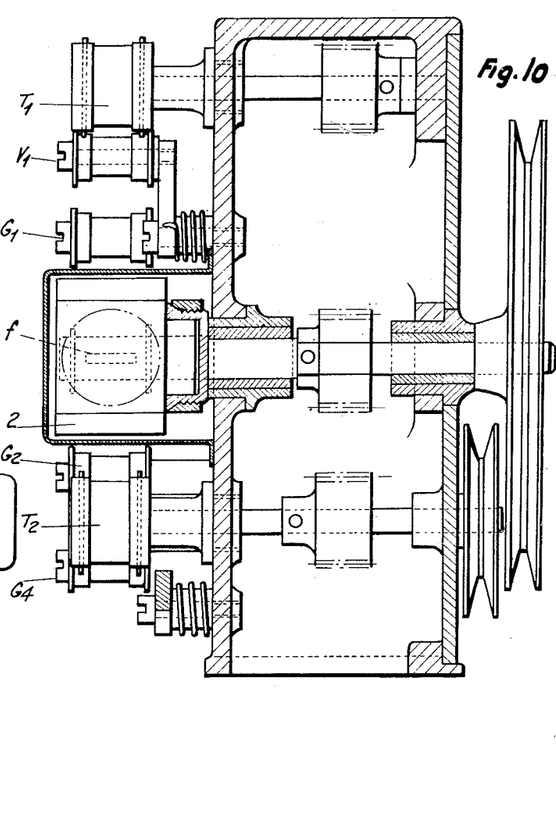
Figure 10 is a section along the plane 10—10—10—10—10 of Figure 9.

In the Figs. 6, 9 and 10, which show the introduction of the invention into a projection apparatus with continuous advance of the film, B is the storage reel; G1, G2, G3, G4 are fixed rollers, V1 and V2 two spring-operated tensioning rollers. The roller 2 is adjustable by a slow motion mechanism by which the image may be framed during the running of the apparatus. $f$ is the window of reduced height, 2 the rotating prism with parallel faces, O the objective, 3 the astigmatic condenser, L the sound reading device, T1 the intake feeding drum, T2 the output feeding drum, B1 the receiving reel. M is the constant speed motor driving the rotating prism 2, Q is the driving shaft for rotating the drum T1, the prism 2 and the drum T2 with proportional speeds. 4 is the diverging collecting lens, 5 the lens correcting the residual astigmatism, and S the electric arc with its mirror 1.

Supposing that the feeding drums T1 and T2 have 4M teeth and that the prisms 2 has 2N faces, a simple calculation shows that, when 2N images shall pass at every turn of the prism, the angular speed ratio between the prism and the feeding drums must be M/2N.

The connection may be realized, for example, as shown on Fig. 6, by a shaft Q driving the feeding drums T1 and T2 and the prism 2 by helical gears giving the above indicated ratio.

However, any other usual transmission may be employed in order to ensure the concordance of the rotations.

The helical gears of the drums T1 and T2 must have a pitch opposed to that of the helical gears of the prism, so as to rotate the prism in one direction, and the drums T1 and T2 in the opposite direction.

As compared with a projecting apparatus of the conventional type, the pressing frame and the image channel are dispensed with. Due to the fact that in the apparatus according to the invention the illumination must be effected through a very narrow rectangular slot, it is possible to use a very simple device comprising a perfectly polished guide formed with a slot for the illumination of the film.

It is sufficient for the guide to be plane over the length of the slot, so as to maintain the film straight in the active zone.

The film is held against the guide without a pressing frame, by the sole tension exerted by the rollers G1 and G2, which are placed behind the slot $f$.

This device, while being very simple, facilitates the introduction of the film into the apparatus and makes it possible to reduce to a minimum the space between the film and the cylindrical surface surrounding the prism and, consequently, the distance from the film to the objective.

The film may also be tensioned on two rollers $g$ (Fig. 8) mounted one on each side of the slot $f$, or both systems may be combined, comprising rollers and the small curved guide inserted between the two rollers, in order to maintain the film in a plane.

As compared with conventional projecting apparatus with a Maltese cross, or with the already realized apparatus with continuous unrolling of the film, the present invention gives the following advantages:

1. No shutting, whereby a considerable economy of light is obtained.

2. Economic use of the films the duration of which is lengthened to the extreme, since they are no more submitted to brutal and intermittent efforts.

3. Simplicity of construction of the projecting apparatus, from the mechanical point of view.

4. Great precision of the optical system which is unlikely to come out of order and is cheap to manufacture.

5. The perforation of the film may be dispensed with, and the film can be driven by smooth drums, like a belt on a pulley, due to the regularity of the uniform movement to be imparted to the film. Any sliding can be made impossible by pressing rollers of rubber, for example.

Up to the present, only conventional methods of illumination for the projection have been considered. However, the continuous advance of the film according to the invention makes it possible to use advantageously the new lamps having a short rectilinear filament (or with linear discharge in a gaseous atmosphere, as the lamp Philips SP 500 w.) having a very intense brilliance.

Figures 8, 11:
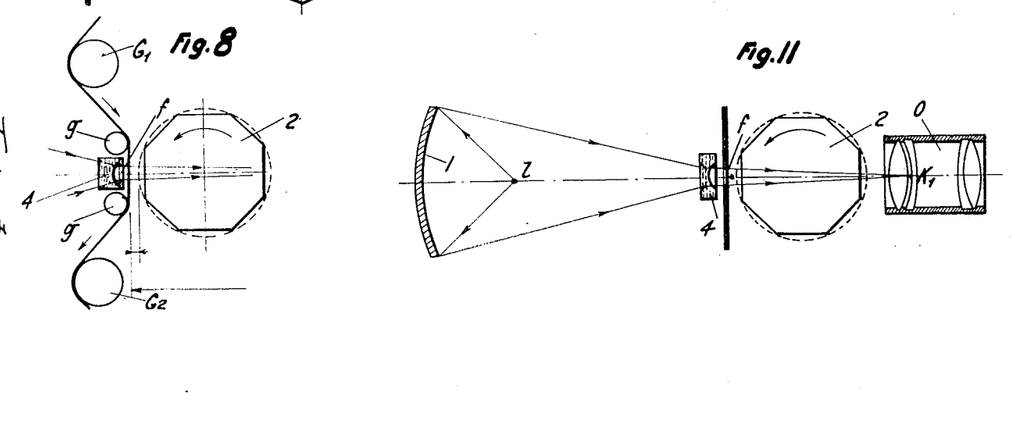
Figure 8 shows a modified form of the means for guiding the film in front of the window.
Figure 11 shows a modification of the optical device in case of the use of an illuminating lamp having a short rectilinear filament.

When using a lamp of this kind, the astigmatic condenser can be dispensed with. It would be sufficient, as shown in Fig. 11, to form by a conveniently calculated mirror 1 the image of the linear source of light slightly in front of the slot $f$, so as to cover the latter completely.

The diverging cylindrical collecting lens 4 would however be always necessary in order to make the light rays converge at the point $K_1$.

It has been explained heretofore that in order to avoid completely the jump of the image $D = y - \delta$, it is necessary to increase the number of faces $2N$ of the prism, but that it is practically impossible to go beyond $N = 4$ or 5, so as to be able to use the entire range of the commercially available objectives. It has also been shown that this drawback could easily be reduced to acceptable proportions by illuminating the film by the sweeping of a narrow luminous slot.

However, there are special cases (for example the very unfrequent case of projecting from behind the screen with very reduced backward space) where it will be necessary to use objectives having a small frontal length, therefore with a great enlargement, in which case the residual jump of the image, greatly amplified, could be harmful to the sharpness of the projection on the screen.

For this special case, it is possible to use a cinematic device which, at the price of a mechanical complication, reduces the bulge of the $D$ curve practically to zero (see Fig. 15), that is to say that practically $D = y - \delta = 0$ for all used values of $i$. This improvement is obtained by replacing the uniform continuous circular movement of the prism with parallel faces by an ondulated continuous circular movement of this prism, while the film is kept advancing continuously and uniformly in front of the slot.

By this means is obtained a perfect equality between $y$ and $\delta$ for all values of $i$ comprised between $i_0$ and $i_m$.

Figure 12:
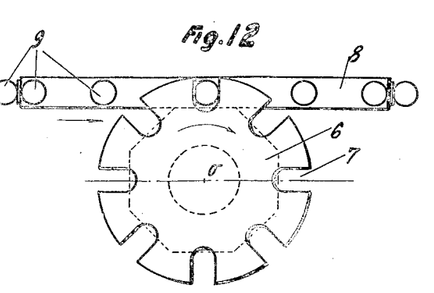
Figure 12 shows the drive of the ondulated movement of the prism, in case of the use of an objective with small frontal length.
Figure 13:
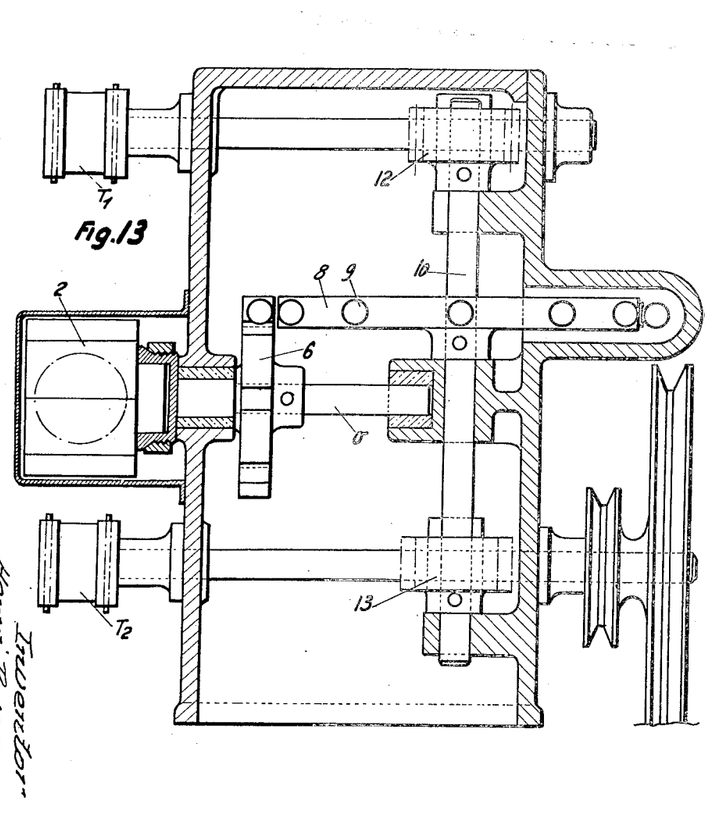
Figure 13 shows this drive incorporated into the projecting apparatus.
Figure 14:
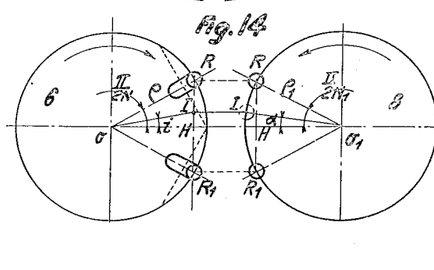
Figure 14 is an explanatory diagram of the action of this drive.

Figs. 12 to 14 show clearly the adopted cinematic device:

On the rotating shaft $o$ of the prism 2 is secured a disk 6 which is formed with a number of slots 7 equal to the number of faces of the prism, that is to say with $2N$ slots, the axis of each slot being perpendicular to one of the faces of the prism.

The disk 6 is driven by a second disk 8 which is perpendicular to the first mentioned disk 6 and carries $2N_1$ steel balls 9 of perfectly calibrated diameter and adapted to engage without play in the slots 7 of the disk 6.

This device constitutes a positive transmission similar to a ratchet wheel gear, but having this particularity that the two disks are placed at right angles to one another, so that their shafts form also a right angle between themselves. The shaft 10 of the ball carrying disk 8 is driven by the constant speed motor and drives simultaneously, by helical gears 12 and 13, the two drums $T_1$ and $T_2$ advancing the film.

It is easy to calculate the transmission so that $2N$ images pass in front of the illumination slot for each turn of the prism, that is to say, so as to maintain the speed ratio $M/2N$, considering that the disk 6 has $2N$ slots, and that the disk 8 carries $2N_1$ balls.

Under these conditions (see Fig. 14), when a ball engages at R one of the slots 7, the preceding ball leaves the preceding slot at R1′, and in this position the plane passing through the axis of both disks and represented by the line $o-o_1$ passes through an edge of the prism limiting two of its consecutive faces (the leaving face and the arriving face).

It is therefore possible to write:

$$i = \frac{\pi}{2N} \text{ and } \alpha = \frac{\pi}{2N_1}$$

and:

$$\overline{RH} = \rho \sin \frac{\pi}{2N} = \rho_1 \sin \frac{\pi}{2N_1}$$

or:

$$\frac{\rho}{\rho_1} = \frac{\sin \frac{\pi}{2N_1}}{\sin \frac{\pi}{2N}}$$

When the disk 8 continues to rotate, the ball comes from R to some intermediate position I, in which:

$$\overline{HI} = \overline{OH} tgi = \rho \cos \frac{\pi}{2N} tgi$$

and:

$$\overline{HI} = \rho_1 \sin \alpha$$

and consequently:

$$\rho_1 \sin \alpha = \rho \cos \frac{\pi}{2N} tgi$$

and:

$$tgi = \frac{\rho_1 \sin \alpha}{\rho \cos \frac{\pi}{2N}} = \frac{\sin \frac{\pi}{2N} \sin \alpha}{\sin \frac{\pi}{2N_1} \cos \frac{\pi}{2N}}$$

and finally:

$$tgi = \frac{\sin \alpha \, tg \frac{\pi}{2N}}{\sin \frac{\pi}{2N_1}}$$

In this formulae, $i =$ angle of incidence of a light beam parallel to the axis of the objective with respect to the face of the prism, which is equal to the angle of rotation of the prism 2 and disk 6 (Figures 13 and 14);
$\alpha$=angle of rotation of the disk 8 corresponding to the angle of rotation $i$ of the disk 6;
$\rho$=pitch radius of the slotted disk 6; and
$\rho_1$=radius of the circle on which the centers of the balls 9 on disk 8 are located.

This formula shows (when the ball carrying disk rotates at continuous uniform speed) that the slotted disk 6 (and with it the prism 2 with parallel faces) will be driven with a continuous movement of variable speed, since the angles $i$ are not directly proportional with the angles $\alpha$. It is easy to show also from the above formula that the movement of the prism is continuously ondulated, and that the ratio between the number of revolutions of the prism with parallel faces and the feeding drum remains equal to M/2N.

This cinematic device consequently introduces a new additional variable factor N1 which makes it possible to obtain an additional correction of $D=y-\delta$, so that between $i=-\pi/2N$ and $i=+\pi/2N$ the value of $D=y-\delta$ is practically equal to zero.

This calculation is made starting from the formula $$tgi = \frac{\sin \alpha tg\frac{\pi}{2N}}{\sin \frac{\pi}{2N1}}$$

combined with the first formula developed above and conveniently modified, which becomes:

$$\frac{N1h\alpha}{\pi} = 2R \cos \frac{\pi}{2N} \sin i \left[ 1 - \sqrt{\frac{1-\sin^2 i}{n^2 - \sin^2 i}} \right]$$

and from which one obtains step by step and by successive approximations the convenient values of N, R and N1, knowing $a$ and $n$, so as to obtain $D=y-\delta=0$.

Figure 15:
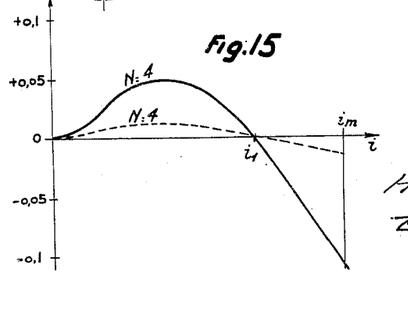
Figure 15 is a diagram showing the modification of the curves of Figure 2, which is obtained by the ondulated movement of the prism.

Fig. 15 shows clearly the obtained improvement. On the same diagram have been drawn the curves $D=y-\delta$ for a prism with 8 faces having a diameter of 2R=73.01 mm., calculated with standard film of 35 mm. and a pitch of $h$=19:
1. With continuous uniform rotation of the prism (in full line), and
2. With continuous ondulated rotation of the prism (in dotted line), the ordinates representing D in hundredths of mm., and the abscisses representing $i$ in degrees, between $i_0$=0 and $i_m$=22° 30'.

I claim:

1. In cinematographic projection apparatus wherein a film bearing images having a normal height in the longitudinal direction of the film is moved continuously past a film gate on which light is focused in a conically converging beam, and a regular polygonal prism having an even number of faces is rotatably mounted between the gate and the objective on an axis which intersects perpendicularly the optical axis of the objective, the combination with said gate of a projection window in the form of a slot extending transversally to the direction of advance of the film and the height of which is substantially one-fourth of the height of the film image, and means for transforming the conical converging beam into a flat beam of elongated elliptical section framing said slot.

2. In cinematographic projection apparatus wherein a film bearing images having a normal height in the longitudinal direction of the film is continuously moved past a film gate in which light is focused in a conically converging beam and a regular polygonal prism having an even number of faces is rotatably mounted between the gate and an objective on an axis which intersects perpendicularly the optical axis of the objective, the combination with said gate of a projection window in the form of a slot extending transversally to the direction of advance of the film and the height of which is substantially one-fourth of the height of the film image, means for transforming the conical converging beam into a flat beam of elongated elliptical section framing said slot, and a divergent cylindrical collecting lens, the generating lines of which are parallel to said slot, said lens being positioned behind said projecting window and slightly behind the point of convergence of the anamorphosed beam.

3. Apparatus as defined in claim 1, wherein the objective has small frontal distance, and said prism is driven in a continuous ondulating rotation.

4. Apparatus as defined in claim 2, wherein the objective has small frontal distance and said prism is driven in a continuous ondulating rotation.

5. Apparatus as defined in claim 1, wherein the objective has small frontal distance, and said prism is driven in a continuous ondulating rotation by a first disk mounted on the prism shaft and having slots equal in number to the faces of said prism, a second disk having balls mounted on its periphery for successively engaging the successive slots in said first disk, and means for rotating said second disk at uniform speed.

6. An apparatus as defined in claim 2, wherein the objective has small frontal distance, and said prism is driven in a continuous ondulating rotation by a first disk mounted on the prism shaft and having slots equal in number to the faces of said prism, a second disk having balls mounted on its periphery for successively engaging the successive slots in said first disk, and means for rotating said second disk at uniform speed.

7. In cinematographic projection apparatus, including a film gate, means for continuously moving past said gate a film bearing images having a normal height in the longitudinal direction of the film, means for focusing a conical converging light beam at said film gate, and a rotary compensating prism, in combination with said gate of a projection window in the form of a slot extending transversally to the direction of advance of the film and the height of which is substantially one-fourth of the height of a film image, and means for transforming the conical converging beam of the illuminating lantern into a flat beam of elongated section framing said slot.

8. In cinematographic projection apparatus, including a film gate, means for continuously moving past said gate a film bearing images having a normal height in the longitudinal direction of the film, means for focusing a conical converging light beam at said gate, and a rotary compensating prism, the combination with said gate of a projection window in the form of a slot extending transversally to the direction of advance of the film and the height of which is substantially one-fourth of the height of the image, means for transforming the conical converging beam of the illuminating lantern into a flat beam of elongated section framing said slot, and a divergent cylindrical collecting lens, the generating lines of which are parallel to said slot, said lens being positioned behind said projecting window and slightly behind the point of convergence of the anamorphosed beam.

HENRI ROGER.

REFERENCES CITED

The following references are of record in the file of this patent:

UNITED STATES PATENTS

| Number | Name | Date |
|---|---|---|
| 708,303 | Bianchi | Sept. 2, 1902 |
| 867,185 | Bianchi | Sept. 24, 1907 |
| 1,143,607 | Bridgen | June 22, 1915 |
| 1,617,596 | Holman | Feb. 15, 1927 |
| 1,655,185 | Hatschek | Jan. 3, 1928 |
| 1,966,803 | Moreno | July 17, 1934 |
| 1,974,423 | Holst et al. | Sept. 25, 1934 |
| 2,168,433 | Parvopassu | Aug. 8, 1939 |
| 2,288,079 | Fitz | June 30, 1942 |
| 2,438,878 | Waller | Mar. 30, 1948 |